INVENTOR.
WAYMAN R. SPENCE

United States Patent Office 3,487,832
Patented Jan. 6, 1970

3,487,832
PROTECTIVE PAD
Wayman R. Spence, Salt Lake City, Utah, assignor to Spenco Corporation, Salt Lake City, Utah, a corporation of Utah
Filed May 29, 1967, Ser. No. 641,919
Int. Cl. A61f 5/30; A61l 15/00
U.S. Cl. 128—153                                9 Claims

ABSTRACT OF THE DISCLOSURE

A protective pad comprising a closed cell foam base with one side coated with a pressure sensitive rubbery adhesive for attaching the pad to a friction irritated portion of a mammal's body. A protective layer of impermeable material can be positioned over the rubbery adhesive to protect the adhesive from becoming soiled.

---

This invention relates to a protective pad, and in particular, to a protective pad adapted to be positioned against portions of the body of a mammal to prevent sores, corns, and other similar afflictions caused by friction.

It is well known that corns, blisters, and the like, common to mammals, are formed when a portion of the mammal's body is subjected to excessive friction. For example, in the case of athletes who are required to rapidly change the direction of their movement, foot blisters are very common because of the excessive friction on the soles of the athlete's feet at the maximum force points which are commonly under the metatarsal head and under the great toe. Similarly, corns are formed when a portion of the body, such as the foot, is subjected to a localized friction or pressure over a long period of time. A corn is a horny induration or callosity of the epidermis, usually with a central sore. Attempts have been made to overcome these problems through the use of inner soles and other pads which are placed within the shoes of a person likely to obtain blisters and by positioning a pad around the corn to substantially isolate it from the friction and pressure which causes said corn. While pads and inner soles of the type described provide a horizontal cushion they do not eliminate transverse or longitudinal friction on the body, which friction causes blisters and corns.

Accordingly, it is a principal object of this invention to provide a protective pad which can be used to prevent blisters, sores, corns, and the like.

Another object of this invention is to provide a protective pad which can be readily shaped to cover and protect any irritated portion of the body.

Still another object of this invention is to provide a protective pad for mammals that is simple in design, inexpensive to construct, and durable in its wear.

Still further objects of this invention will become apparent to those skilled in the art as the invention is better understood by reference to the detailed description appearing hereinafter.

Briefly, the invention comprises a protective pad comprising a closed cell foam base with one side coated with a pressure sensitive rubbery adhesive for attaching the pad to a friction irritated portion of a mammal's body. A protective layer of impermeable material can be positioned over the pressure sensitive rubbery adhesive when the pad is not in use to prevent the adhesive from becoming soiled. Preferably, the foam base has a compression set of less than 50 percent and a linear elongation of about ¼ inch.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

Figure 1:
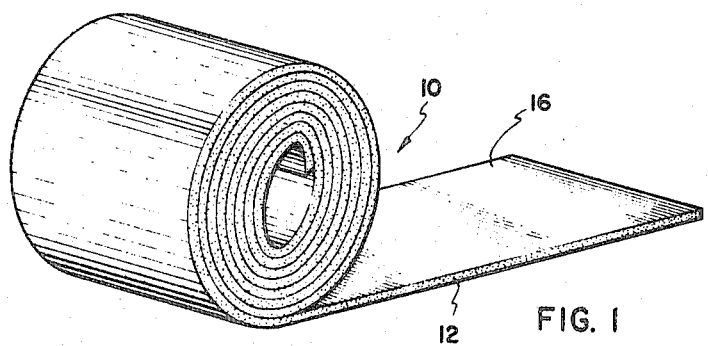
FIG. 1 is a schematic representation of a roll of the protective pad of this invention.
Figure 2:
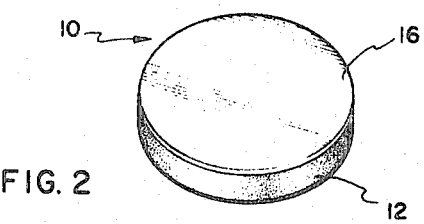
FIG. 2 is a schematic representation of the protective pad of this invention cut to be used as a corn pad.
Figure 3:
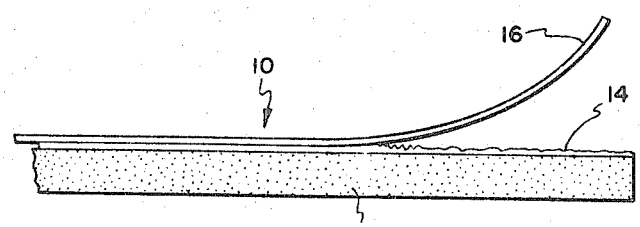
FIG. 3 is a side view of the protective pad of this invention covered with an impermeable protective layer which is shown partially pulled away from the pad's pressure sensitive adhesive.
Figure 4:
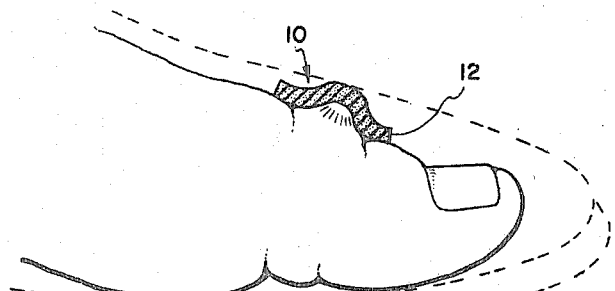
FIG. 4 is a plan elevation view of the protective pad of this invention positioned over a corn growth on the great toe of a person's foot. The protective pad is shown in section for purpose of clarity.

Referring now more particularly to the drawings, in FIG. 1 there is shown the protective pad 10 of this invention in tape form turned into a roll. The same pad is shown in FIG. 2 cut in a circular shape to be applied to a predetermined portion of the body of a mammal. The pad comprises a closed cell foam base 12 with a rubbery pressure sensitive adhesive 14 spread on at least one surface of the base. To protect the rubbery adhesive from becoming soiled while the pad is not in use, a substantially impermeable protective layer 16, formed from a plastic film, or the like, can be positioned over the adhesive.

Base 12 is constructed from a closed cell foam, i.e., a foam with individual cells which are out of communication from each other, such as neoprene, closed cell rubber, polyvinyl chloride, rubber latex, vinyl foam, and the like. In addition to being of a closed cell construction, base 12 preferably has a maximum compression set of less than 60 percent, and most preferably, less than 50 percent. Compression set is a well established term generally defined as the degree of inelasticity of the foam after it has been subjected to a compressive force. Stated in another fashion, compressive set is the extent to which the foam fails to regain its original shape after being subjected to a compressive force. The foam from which base 12 is constructed also preferably has a two-way linear elongation of about ⅛ to ½ inch. Such foams generally exhibit a rotational elongation when compressed of at least 30 degrees, and this is preferred. Linear elongation is defined as the linear movement of one face of the foam base with respect to the opposite face when a linear point force is applied to the one face, and rotational elongation is defined as the rotational movement of the face when a rotational force is applied thereto. So that base 10 can be easily shaped about a curved surface, it is preferably used in the form of a sheet having a substantially uniform thickness of about 3/32 to ½ inch and most preferably, about ⅛ to ⅜ inch.

At least one surface of foam base 12 is coated with a rubbery adhesive so that the elastic characteristics of the foam are not destroyed by the adhesive. Many rubbery adhesives are available for this purpose such as rubber solution, gutta-percha, neoprene, silicone type, and the like. So that protective layer 16 can be easily removed from base 12 and so that the tape can be removed from its protective placement on the body, the adhesive is preferably a pressure sensitive type that does not require heat or liquid to activate it but only moderate finger pressure. The rigidity of the adhesive film can be reduced by adding small quantities of plasticizers or solvents to the adhesive. For example, a plasticizer such as a copolymer of acrylic nitrile and butadiene would accomplish this purpose. As indicated, the adhesive should be rubbery enough so that its use does not impair the elastic characteristics of foam base 12, i.e., it has a two-way linear elongation at least as great as the two-way linear elongation of base 12.

In using the protective pad of this invention, it is cut to the shape most suited for application against that portion of the body which is to be protected. For example, when the pad is to be used to protect corns, it is preferably circular shaped and is sized to fit over the corn and a portion of the body surrounding the corn. Since the closed cell foam has a two-way elasticity there is no need for providing an opening in the center portion of the pad such as had heretofore been required. Any friction imparted to the pad's surface is absorbed in the pad and is not transmitted to the corn. The protective pad can, of course, be used to protect the body from other irritations caused by friction.

Whereas there is here illustrated and specifically described a certain preferred construction which is presently regarded as the best mode of carrying out the invention, it should be understood that various changes may be made and other construction adopted without departing from the inventive subject matter particularly pointed out and claimed.

I claim:

1. A protective pad comprising a closed cell foam base, having a two way linear elongation which allows one face of the base to shift laterally ⅛ to ½ inch with respect to the other face when a lateral force is applied to said one face, and a pressure-sensitive rubbery adhesive is coated on one face of said base.

2. The protective pad of claim 1 wherein said pad is shaped to be positioned over a corn growth.

3. The protective pad of claim 1 wherein said pad has a compression set of less than 60 precent.

4. The protective pad of claim 2 wherein said pad has a compression set of less than 60 percent.

5. The protective pad of claim 1 wherein a layer of protective material is positioned over the rubbery adhesive to protect the adhesive from becoming soiled.

6. The protective pad of claim 5 wherein said foam base is a sheet having a substantially uniform thickness of 3/32 to ½ inch.

7. The protective pad of claim 6 wherein said foam base is a neoprene foam.

8. The protective pad of claim 7 wherein said foam base has a compression set of less than 50 percent.

9. The protective pad of claim 8 wherein said base is shaped to be positioned over a corn growth.

References Cited

UNITED STATES PATENTS

| | | | |
|---|---|---|---|
| 2,633,127 | 3/1953 | Scholl | 128—153 |
| 2,854,974 | 10/1958 | Ashton et al. | 128—153 |
| 3,132,648 | 5/1964 | Scholl | 128—153 |

ADELE M. EAGER, Primary Examiner

U.S. Cl. X.R.

128—156